United States Patent [19]

Kuo et al.

[11] Patent Number: 5,861,196
[45] Date of Patent: Jan. 19, 1999

[54] LASER TEXTURING A GLASS OR GLASS-CERAMIC SUBSTRATE

[75] Inventors: David Kuo, Castro Valley; Stan Vierk, Pleasanton, both of Calif.

[73] Assignee: Seagate Technology, Inc., Scotts Valley, Calif.

[21] Appl. No.: 937,461

[22] Filed: Sep. 25, 1997

[51] Int. Cl.⁶ ..................................................... B05D 3/00
[52] U.S. Cl. ......................... 427/555; 427/129; 427/314
[58] Field of Search .................................... 427/555, 129, 427/314

[56] References Cited

U.S. PATENT DOCUMENTS

| | | |
|---|---|---|
| 3,674,340 | 7/1972 | Jacob . |
| 3,689,293 | 9/1972 | Beall . |
| 3,732,087 | 5/1973 | Grossman . |
| 3,764,218 | 10/1973 | Schedewie . |
| 3,938,878 | 2/1976 | Fox . |
| 4,060,306 | 11/1977 | Swaminathan . |
| 4,139,263 | 2/1979 | Lehureau et al. . |
| 4,386,162 | 5/1983 | Beall . |
| 4,467,039 | 8/1984 | Beall . |
| 4,608,348 | 8/1986 | Beall et al. . |
| 4,971,932 | 11/1990 | Alpha et al. . |
| 4,985,306 | 1/1991 | Morizane et al. . |
| 5,062,021 | 10/1991 | Ranjan et al. . |
| 5,079,657 | 1/1992 | Aronoff et al. . |
| 5,108,781 | 4/1992 | Ranjan et al. . |
| 5,128,914 | 7/1992 | Kurata et al. . |
| 5,143,578 | 9/1992 | Luthi . |
| 5,162,073 | 11/1992 | Aronoff et al. . |
| 5,166,006 | 11/1992 | Lai et al. . |
| 5,202,810 | 4/1993 | Nakamura et al. . |
| 5,236,763 | 8/1993 | Luthi . |
| 5,273,834 | 12/1993 | Hoover et al. . |
| 5,391,522 | 2/1995 | Goto et al. . |
| 5,402,407 | 3/1995 | Eguchi et al. . |
| 5,416,755 | 5/1995 | Endo et al. . |

FOREIGN PATENT DOCUMENTS 0 652 554 A1 5/1995 European Pat. Off. .

OTHER PUBLICATIONS

Baumgart, P. et al., "A New Laser Texturing Technique for High Performance Magnetic Disk Drives", IEEE Transactions on Magnetics, vol. 31, No. 6, pp. 2946–2951, Nov. 1995.

*Primary Examiner*—Bernard Pianalto
*Attorney, Agent, or Firm*—McDermott, Will & Emery

[57] ABSTRACT

A magnetic recording medium is formed with a laser textured glass, ceramic or glass-ceramic substrate. The use of a pulsed, focused laser light beam, such as a $CO_2$ derived laser light beam, through an acoustic-optical modulator enables the use of a high pulse repetition rate and/or short pulses. The resulting laser textured substrate comprises a plurality of dome-like protrusions extending above the substrate.

15 Claims, 6 Drawing Sheets

Bench Top AO/CW Laser Texturing System

LASER TEXTURING A GLASS OR GLASS-CERAMIC SUBSTRATE

TECHNICAL FIELD

The present invention relates to the recording, storage and reading of magnetic data, particularly rotatable magnetic recording media, such as thin film magnetic disks having textured surfaces for contact with cooperating magnetic transducer heads. The invention has particular applicability to high density magnetic recording media for mobile computer data storage applications.

BACKGROUND ART

Thin film magnetic recording disks and disk drives are conventionally employed for storing large amounts of data in magnetizable form. Typically, one or more disks are rotated on a central axis in combination with data transducer heads. In operation, a typical contact start/stop (CSS) method commences when the head begins to slide against the surface of the disk as the disk begins to rotate. Upon reaching a predetermined high rotational speed, the head floats in air at a predetermined distance from the surface of the disk due to dynamic pressure effects caused by air flow generated between the sliding surface of the head and the disk. During reading and recording operations, the transducer head is maintained at a controlled distance from the recording surface, supported on a bearing of air as the disk rotates, such that the head can be freely moved in both the circumferential and radial directions allowing data to be recorded on and retrieved from the surface of the disk at a desired position. Upon terminating operation of the disk drive, the rotational speed of the disk decreases and the head again begins to slide against the surface of the disk and eventually stops in contact with and pressing against the disk. Thus, the transducer head contacts the recording surface whenever the disk is stationary, accelerated from the stop and during deceleration just prior to completely stopping. Each time the head and disk assembly is driven, the sliding surface of the head repeats the cyclic operation consisting of stopping, sliding against the surface of the disk, floating in the air, sliding against the surface of the disk and stopping.

It is considered desirable during reading and recording operations to maintain each transducer head as close to its associated recording surface as possible, i.e., to minimize the flying height of the head. Thus, a smooth recording surface is preferred, as well as a smooth opposing surface of the associated transducer head, thereby permitting the head and the disk to be positioned in close proximity with an attendant increase in predictability and consistent behavior of the air bearing supporting the head. However, if the head surface and the recording surface are too flat, the precision match of these surfaces gives rise to excessive stiction and friction during the start up and stopping phases, thereby causing wear to the head and recording surfaces eventually leading to what is referred to as a "head crash." Thus, there are competing goals of reduced head/disk friction and minimum transducer flying height.

Conventional practices for addressing these apparent competing objectives involve providing a magnetic disk with a roughened recording surface to reduce the head/disk friction by techniques generally referred to as "texturing." Conventional texturing techniques involve polishing the surface of a disk substrate to provide a texture thereon prior to subsequent deposition of layers, such as an underlayer, a magnetic layer, a protective overcoat, and a lubricant topcoat, wherein the textured surface on the substrate is intended to be substantially replicated in the subsequently deposited layers.

Figure 1:
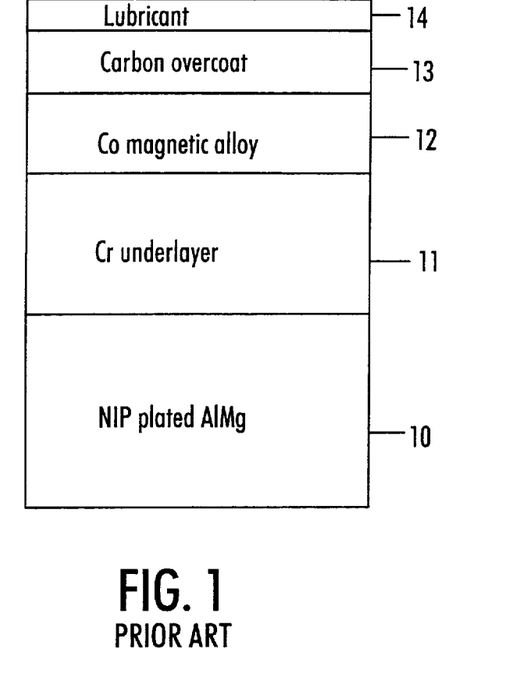
FIG. 1 schematically depicts a conventional magnetic recording medium structure.

A typical magnetic recording medium is depicted in FIG. 1 and comprises a substrate 10, typically an aluminum (Al)-base alloy, such as an aluminum-magnesium (Al—Mg) alloy, plated with a layer of amorphous nickel-phosphorous (NiP). Substrate 10 typically contains sequentially deposited thereon a chromium (Cr) underlayer 11, a magnetic layer 12 which is usually a cobalt (Co)-base alloy, a protective overcoat 13 which usually comprises carbon, and a lubricant topcoat 14. Cr underlayer 11, Co-base alloy magnetic layer 12 and protective carbon overcoat 13 are typically deposited by sputtering techniques. A conventional Al-alloy substrate is provided with a NiP plating primarily to increase the hardness of the Al substrate, serving as a suitable surface for polishing to provide the requisite surface roughness or texture, which is intended to be substantially replicated on the disk surface.

The escalating requirements for high areal recording density impose increasingly greater requirements on thin film magnetic media in terms of coercivity, squareness, low medium noise and narrow track recording performance. In addition, increasingly high density and large-capacity magnetic disks require increasingly smaller flying heights, i.e., the distance by which the head floats above the surface of the disk in the CSS drive. The requirement to further reduce the flying height of the head renders it particularly difficult to satisfy the requirements for controlled texturing to avoid stiction and/or head crash.

Conventional techniques for providing a disk substrate with a textured surface comprise a mechanical operation, such as polishing. See, for example, Nakamura et al., U.S. Pat. No. 5,202,810. Conventional mechanical texturing techniques are attendant with numerous disadvantages. For example, it is extremely difficult to provide a clean textured surface due to debris formed by mechanical abrasions. Moreover, the surface inevitably becomes scratched during mechanical operations, which contributes to poor glide characteristics and higher defects. In addition, various desirable substrates are difficult to process by mechanical texturing. This undesirably limiting facet of mechanical texturing, virtually excludes the use of many materials for use as substrates.

Another alternative texturing technique to mechanical texturing comprises the use of a laser light beam focused on an upper surface of a non-magnetic substrate. See, for example, Ranjan et al., U.S. Pat. No. 5,062,021, wherein the disclosed method comprises polishing an NiP plated Al substrate to a specular finish, and then rotating the disk while directing pulsed laser energy over a limited portion of the radius, to provide a textured landing zone leaving the data zone specular. The landing zone comprises a plurality of individual laser spots characterized by a central depression surrounded by a substantially circular raised rim.

Another laser texturing technique is reported by Baumgart et al. "A New Laser Texturing Technique for High Performance Magnetic Disk Drives," IEEE Transactions on Magnetics, Vol. 31, No. 6, pp. 2946–2951, November 1995. The laser texturing technique disclosed by Baumgart et al. employs a single focusing lens, and the shape of the resulting protrusions are shown to be altered by adjusting the pulse energy. At low pulse energies, the bump or protrusion shape comprises a central depression and a surrounding rim, similar to that reported by Ranjan et al. As the pulse energy is increased, the bottom of the depression flattens into a rounded, smooth, central dome resembling a "sombrero." At higher powers, the central dome broadens and decreases in height to eventually become equal to or lower than the rim.

In copending application Ser. No. 08/666,374 filed on Jun. 27, 1996, a laser texturing technique is disclosed employing a multiple lens focusing system for improved control of the resulting topographical texture. In copending application Ser. No. 08/666,374 filed on Jun. 27, 1996, a laser texturing technique is disclosed wherein a pulsed, focused laser light beam is passed through a crystal material to control the spacing between resulting protrusions.

Conventional laser texturing techniques have previously been applied to metal-containing substrates or substrates having a metal-containing surface, such as Ni—P plated Al or Al-base alloys. Such substrates, however, exhibit low head impact resistance due to the low mechanical yield strength, thereby limiting their utility so that they are not particularly desirable for use in mobile computer data storage applications, such as laptop computers. Glass and glass-ceramic substrates exhibit superior resistance to shock than Ni—P coated Al or Al-alloy substrates. Accordingly, glass and glass-ceramic substrates are desirable candidates for use in mobile computer data storage applications. However, it is extremely difficult to provide an adequate texture on a glass or a glass-ceramic substrate, particularly in view of the escalating requirements for high areal recording density.

Conventional practices for texturing a glass or glass-ceramic substrate comprise heat treatment. Goto et al., U.S. Pat. No. 5,391,522, discloses a glass ceramic substrate suitable for use in a magnetic recording medium. A textured surface is provided by heat treatment, during which the recrystallization temperature is maintained for about 1 to about 5 hours to generate secondary crystal grains forming the surface texture characterized by irregular protrusions with surrounding valleys extending into substrate.

Hoover et al., U.S. Pat. No. 5,273,834 discloses the use of alternate substrates, such as glass-ceramic substrates. The substrate material is provided with ions for absorbing radiation in the near infrared portion of the spectrum, thereby rendering the material capable of attaining elevated temperatures during film deposition.

The use of heat treatment to form a textured surface on alternate substrates, such as glass or glass-ceramic substrates, is undesirably slow and inefficient in terms of energy consumption. Significantly, it is extremely difficult to exercise control over the size and shape of the secondary crystal grains due to inherent limitations in controlling temperature uniformity. Accordingly, it is virtually impossible to provide a glass or glass-ceramic substrate with a controlled textured landing zone for optimizing flying height and maximizing data zone recording density. Moreover, the resulting texture comprises irregularly shaped protrusions with surrounding valleys extending into the substrate, thereby creating undesirable stress profiles during subsequent deposition of layers by sputtering at elevated temperatures. Such undesirable stress profiles render it extremely difficult to accurately replicate the texture in subsequently deposited layers.

In copending application Ser. No. 08/880,368 filed on Jun. 23, 1997 (Our Docket No. 2674-044), a method is disclosed for laser texturing a surface of a glass-ceramic substrate, wherein the crystalline phase of the glass-ceramic substrate is controlled to less than about 70% by volume. In copending application Ser. No. 08/796,830 filed on Feb. 7, 1997, a method is disclosed for laser texturing a surface of a glass or glass-ceramic substrate, wherein the height of the resulting protrusions is controlled by controlling the quench rate during resolidification of the laser formed protrusions. In EPO 0 652 554 A1 published Oct. 5, 1995, a method is disclosed for laser texturing a glass, ceramic or glass-ceramic substrate employing a pulsed $CO_2$ laser light beam.

There exists a need to provide a magnetic recording medium comprising a glass, ceramic or glass-ceramic substrate having an accurately controlled texture, and to provide a method of accurately texturing a glass or glass-ceramic substrate. There also exists a need for a method to laser texture a glass, ceramic or glass-ceramic substrate for a magnetic recording medium employing a high pulse repetition rate to enhance throughput. There further exists a need for a method of laser texturing a glass, ceramic or glass-ceramic substrate for a magnetic recording medium employing very short laser pulses for high energy efficiency.

DISCLOSURE OF THE INVENTION

An object of the present invention is a method of accurately laser texturing a glass, ceramic or glass-ceramic substrate to provide a controllable topography.

Another object of the present invention is a method of accurately laser texturing a glass, ceramic or glass-ceramic substrate for a magnetic recording medium employing short laser pulses and/or a high pulse repetition rate.

A further object of the present invention is an apparatus for laser texturing a glass, ceramic or glass-ceramic substrate for a magnetic recording medium capable of employing short laser pulses and/or a high pulse repetition rate.

Additional objects, advantages and other features of the invention will be set forth in the description which follows and in part will become apparent to those having ordinary skill in the art upon examination of the following or may be learned from the practice of the invention. The objects and advantages of the invention may be realized and obtained as particularly pointed out in the appended claims.

According to the present invention the foregoing and other objects are achieved in part by a method comprising of manufacturing a magnetic recording medium, which method comprises: texturing the surface of a glass, ceramic or glass-ceramic substrate by exposing the surface to a pulsed, focused laser light beam, through an acoustic-optical modulator to form a plurality of dome-like protrusions.

Another aspect of the present invention is an apparatus for laser texturing a glass, ceramic or glass-ceramic substrate, which apparatus comprises: a laser light beam source; an acoustic-optical modulator through which the laser light beam is passed; a lens focusing system; and means for rotating the substrate during laser texturing.

Additional objects and advantages of the present invention will become readily apparent to those skilled in the art from the following detailed description, wherein embodiments of the invention are described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE INVENTION

The inability to control texturing of a glass, ceramic or glass-ceramic substrate formed by conventional heat treating practices renders such conventional heat treatment unsuitable for providing glass or glass-ceramic substrate surfaces with an accurately textured landing zone leaving an untextured, e.g., polished or specular, data zone. Prior attempts to employ laser texturing on a glass, ceramic or glass-ceramic substrate, typically employing an RF power supply, such as that disclosed in EPO 0 652 554 A1, disadvantageously suffer from poor throughput and inefficient utilization of energy. The present invention overcomes the lack of control attendant upon conventional practices for texturing a glass or glass-ceramic substrate by providing a method and apparatus for laser texturing a glass, ceramic or glass-ceramic substrate for a magnetic recording medium at high production throughput with efficient utilization of energy.

It was found that the surface of a glass or glass-ceramic substrate can be controllably and accurately textured employing a pulsed, focused laser light beam. The application of a pulsed, focused laser light beam, particularly a laser light beam having a wave length of about 10 $\mu$m, such as a laser light beam derived from a CW $CO_2$ laser source, enables accurate and controlled localized texturing of a glass or glass-ceramic substrate. Thus, in accordance with the present invention, a pulsed, focused laser light beam is employed to provide a precise delineation of the textured area boundary, thereby enabling accurate and reproducible formation of a textured landing zone having substantially uniform protrusions, while maximizing the area available for data storage. In addition, the ability to control texturing a surface of a magnetic recording medium, which surface comprises a landing zone and data zone, enables control of the head/disk spacings while reducing friction and wear. It was further found that an RF power supply disadvantageously limited the pulse repetition rate to e.g., typically less than about 20 kHz. Moreover, conventional laser texturing systems cannot achieve a short pulse rate, e.g., less than about 1 $\mu$s, thereby inefficiently utilizing energy.

In accordance with the present invention an acoustic-optical modulator (AOM) is provided to create the laser pulse train. AOMs are typically employed in the printing industry for laser printers and are commercially available from various sources. AOMs suitable for use in accordance with the present invention include any of those commercially available, such as Model 3000 Series available from Crystal Technology, Inc. in Palo Alto, Calif.

An AOM typically operates by applying ultrasonic vibrations through a piezo electric transducer to generate diffraction grating in a piece of crystal, such as germanium, or amorphous material, such as glass. The diffraction grating, when enacted by traveling acoustic wave inside the media, will split the incoming laser beam into zeroth and first order beam. The first order beam can be chopped to various pulse width and pulse period. Furthermore, its light intensity can be adjusted for active power level control. After extensive experimentation and investigation it was found that the use of an AOM in the context of laser texturing a substrate, particularly a glass, ceramic or glass-ceramic substrate for a magnetic recording medium, enables the use of a high pulse repetition rate, significantly higher than that obtainable by an RF pulsed laser, which is limited by the relaxation time of the laser cavity and is typically less than about 20 kHz. It was found that utilizing a 20 watt CW $CO_2$ laser, the pulse repetition rate can easily reach in excess of 100 kHz. It was further found as the power of the laser is increased, the pulse repetition rate can also be increased. Pulse repetitions in excess of 300 kHz can be obtained. For example, it was found that employing a 100 watt CW $CO_2$ laser, a pulse repetition rate in excess of 400 kHz was obtained. Such high pulse repetition rates increase manufacturing throughput and, hence, afford a competitive advantage.

Another advantage in utilizing an AOM in the context of a laser texturing system is the efficient utilization of energy. In employing an AOM device having a high bandwidth, e.g., greater than 2 MHz, the pulse can be significantly reduced to a shorter duration, e.g., less than 1 $\mu$s, thereby increasing energy efficiency.

In accordance with the inventive method, the surface of a glass, ceramic or glass-ceramic substrate is textured by exposing the substrate to a pulsed focused laser light beam through an AOM to form a plurality of dome-like protrusions. The use of an AOM enables the use of a high pulse repetition rate, e.g., in excess of 100 kHz, as by employing a 20 watt CW $CO_2$ laser source. The pulse repetition rate can be increased to in excess of 300 kHz by increasing the laser power. For example, in accordance with the present invention, a glass, ceramic or glass-ceramic substrate is exposed through a 100 watt CW $CO_2$ laser source through an AOM to using a pulse repetition rate in excess of 300 kHz, e.g., in excess of 400 kHz. The present invention also comprises exposing a glass, ceramic or glass-ceramic substrate to a CW $CO_2$ laser light beam through an AOM having a bandwidth greater than 2 MHz, thereby enabling the use of a low width of less than 1 $\mu$s.

In an embodiment of the present invention, a glass, ceramic or glass-ceramic substrate is exposed to a pulsed, focused $CO_2$ laser beam to form localized crystallization by short pulses. The resulting texture of the present invention is different from the texture produced by laser texturing a metallic substrate. The resulting texture of the present invention comprises a plurality of relatively uniformly rounded dome-like protrusions or bumps extending above the substrate surface without surrounding valleys extending substantially into the surface. Such a topography is preferred, since it affords greater protrusion stability and enables greater control of the protrusion height for improved glide and CSS performance. The accuracy of the present invention enables texturing a selected portion of a glass or glass-ceramic substrate to form a controlled landing zone, with substantially no texturing provided in the data zone.

The present invention comprises the use of a pulsed, focused CW $CO_2$ laser beam to provide localized density change on the surface of a glass, ceramic or glass-ceramic substrate, thereby inducing topographical changes in a controllably uniform manner. By controlling relevant process parameters, e.g. pulse width, spot size, pulse repetition rate and pulse energy, as well as the composition, structure and chemical strengthening of the substrates, the protrusion height is accurately controlled.

Figure 2:
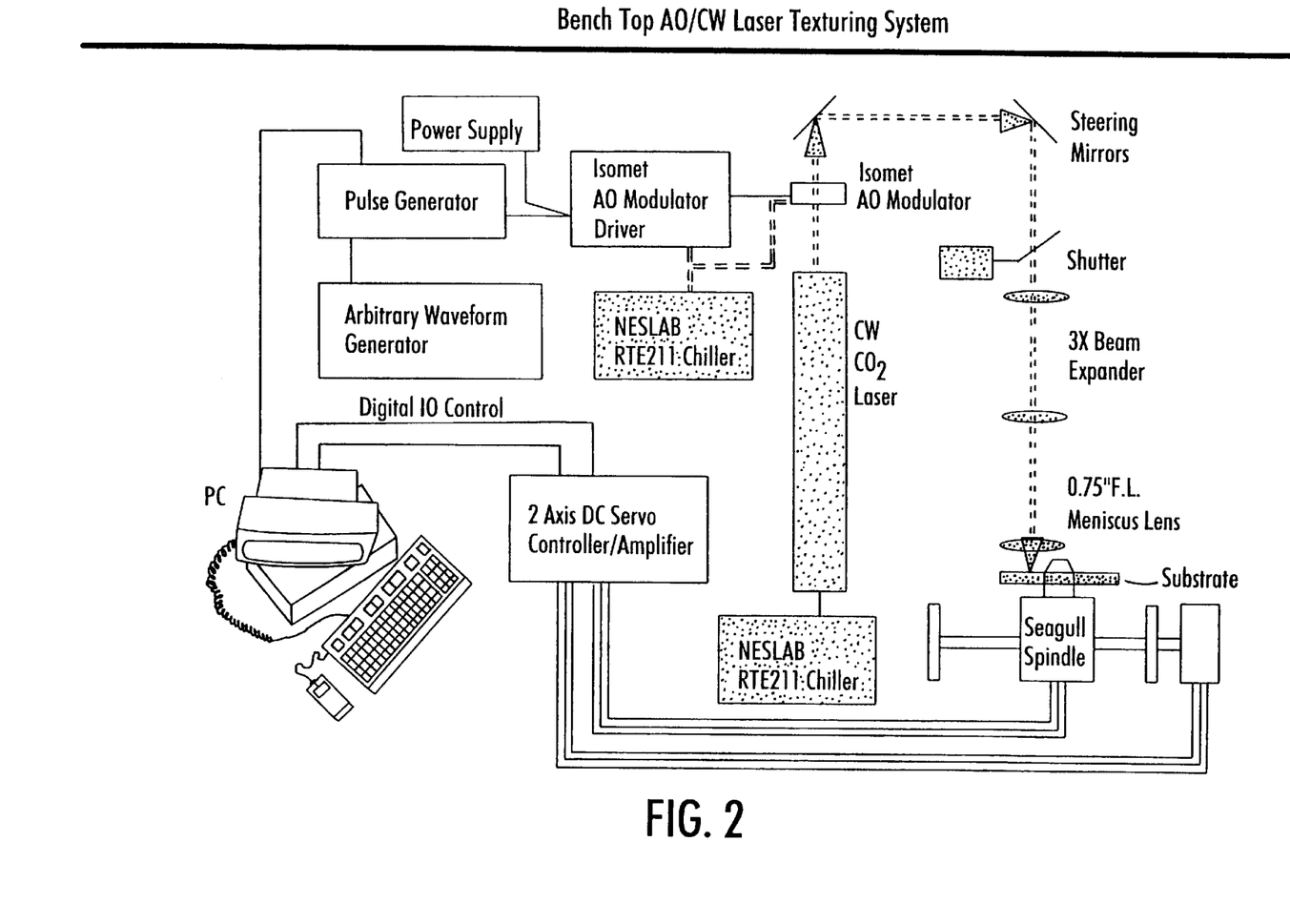
FIG. 2 schematically depicts a laser texturing system in accordance with an embodiment of the present invention.

The present invention can be practiced employing any of various laser light beam devices, such as the apparatus schematically depicted in FIG. 2 which comprises a CW $CO_2$ laser. Emitted laser light beam passes sequentially through the indicated AOM, steering mirrors, beam expander and focusing system onto the surface of a rotating substrate, e.g., rotated by a conventional spindle. The schematic in FIG. 2 illustrates further external control and associated equipment, including a bench top personal computer.

In accordance with the present invention, any of various conventional as well as commercially available alternate substrates, i.e., glass, ceramic and glass ceramic substrates can be employed in manufacturing a magnetic recording medium using laser texturing. Suitable substrates includes Ohara TS 10, Corning Flint, and Sodalime Glass. Various conventional laser systems can be employed in the practice of the present invention. However, a 20 W CW $CO_2$ laser has been found particularly suitable. The duty cycle can be adjusted continuously with an external AOM to control the pulse energy for different protrusion heights. Typically, the optics of this particular laser system yield a spot size of about 70 $\mu$m.

The impact of laser parameters, such a pulse width, pulse energy and spot size on protrusion topography is illustrated experimentally with a silicon-based glass-ceramic substrate. Protrusion height is of significant interest, in that it is one of the key factors effecting laser texture performance.

Figure 3:
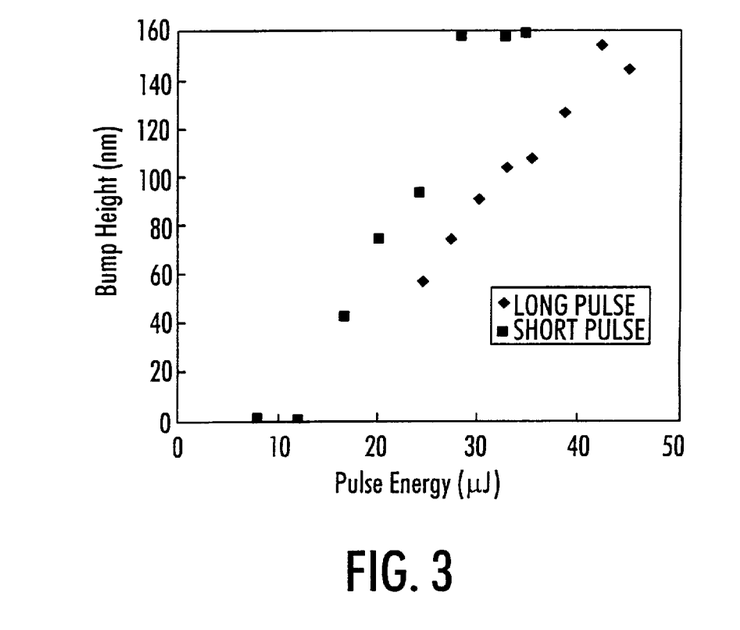
FIG. 3 are plots of protrusion height vs. pulse energy for pulse widths of 14 $\mu$s and 20 $\mu$s.

FIG. 3 is a plot of the relationship of protrusion height to the pulse energy and pulse width with a beam diameter of about 30 $\mu$m. It was observed that dome-shaped protrusions are first formed after a threshold energy is reached. As pulse energy increases, the dome-shaped protrusions grow in size and in height. The top of the dome gradually flattens and eventually collapses to form crater shaped extrusions at elevated pulse energies. Protrusion height is fairly linear with pulse energy at low energies, where the protrusion shape basically remains dome-like. As the protrusion transforms into a cradle-like shape, the protrusion height becomes flattened with higher pulse energy. As the pulse width becomes longer, i.e., 20 $\mu$s, the relationship of protrusion shape and protrusion height with pulse energy is similar to that of a shorter pulse width, i.e., 14 $\mu$s. However, for the same pulse energy, the protrusion height is lower with a longer pulse width. The slope of the protrusion height to pulse energy in the linear range is also lower for a longer pulse width.

Figure 4:
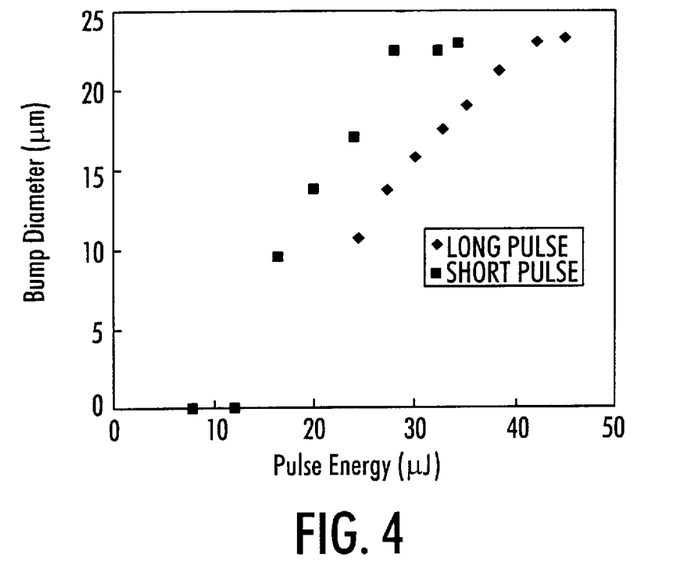
FIG. 4 are plots of protrusion diameter vs. pulse energy for pulse widths of 14 $\mu$s and 20 $\mu$s at a spot size of 30 $\mu$m.

Protrusion diameter is a function of pulse energy and pulse width with a beam diameter of about 30 $\mu$m as shown in FIG. 4, wherein the protrusion diameter increases monatomically with pulse energy. At the same pulse energy, the protrusion diameter for the shorter pulse width is larger than that for the longer pulse width. This is believed to result from competition between radiation heating by laser pulse and conduction cooling through the substrate which controls the size of the melted pool. A shorter pulse of equal energy will allow less time for the substrate to conduct heat away during heating. Consequently, the surface temperature of the substrate can reach a higher value, resulting in a larger melted pool size.

Figure 5:
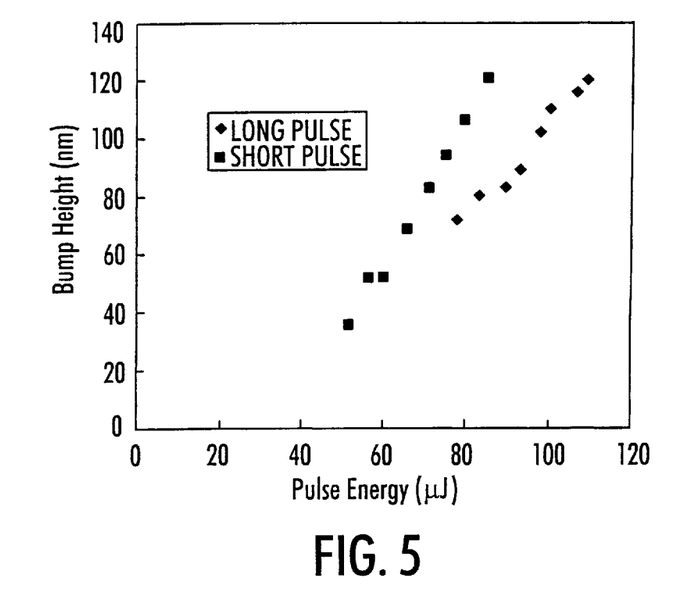
FIG. 5 are plots of protrusion height vs. pulse energy for pulse widths of 14 $\mu$s and 20 $\mu$s at a spot size of 100 $\mu$m.

For a larger laser beam size, e.g., about 100 $\mu$m in diameter, the protrusion height and pulse energy relationship is plotted in FIG. 5. Two constant pulse-width curves of 14 $\mu$s and 20 $\mu$s are shown. In each case, protrusion topography evolution is not significantly different from that of the small beam diameter. Topography generally begins with the dome-shape at low energy and transforms into a depressed-center crater shape at higher pulse energy. The energy required to create a protrusion with a similar height is larger for a larger beam diameter. The protrusion height is also fairly linear with pulse energy for both the short pulse and the long pulse curves. Protrusion height as well as the slope of the height-energy curve is higher for a shorter pulse width.

Figure 6:
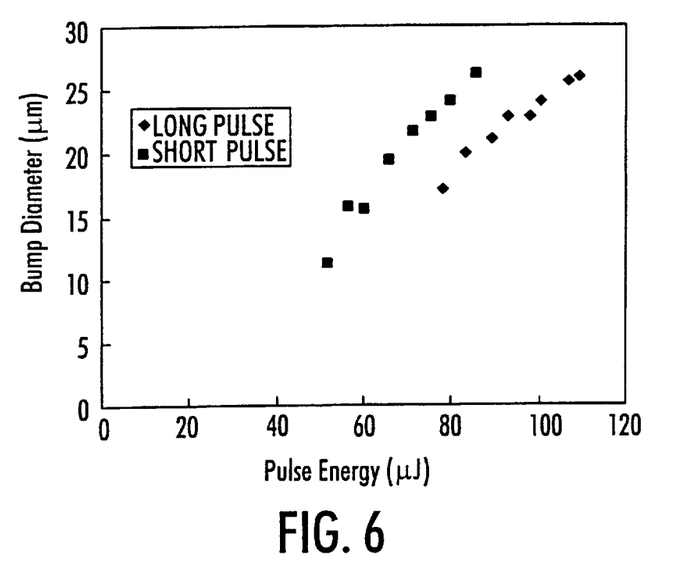
FIG. 6 are plots of protrusion diameter vs. pulse energy for pulse widths of 14 $\mu$s and 20 $\mu$s at a spot size of 100 $\mu$m.

FIG. 6 shows the bump diameter vs. pulse energy plot with a beam diameter of about 100 $\mu$m. With the larger laser beam diameter, the protrusion size is larger, the protrusion diameter increases with pulse energy, and the protrusion diameter of a shorter pulse width is somewhat larger than that of the longer pulse width.

Figure 7:
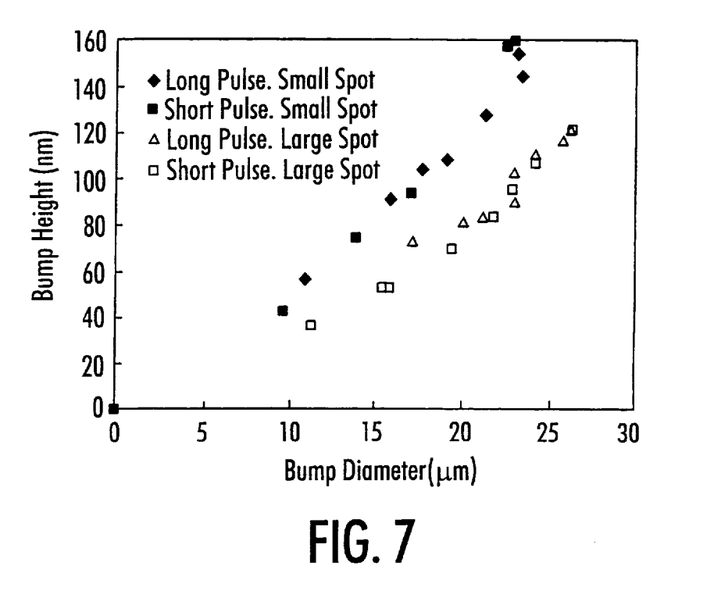
FIG. 7 are plots of protrusion height vs. protrusion diameter for spot sizes of about 30 $\mu$m and about 100 $\mu$m and pulse widths of 14 $\mu$s and 20 $\mu$s.

Protrusion height vs. protrusion diameter is shown in FIG. 7. At the same laser beam spot size, protrusion height is a function of protrusion diameter and apparently independent of laser pulse width. Unlike laser protrusions on NiP—Al substrates where the heating rate has a significant influence on molten mass dynamics and, hence, on protrusion topography, the heating rate of glass-ceramic substrates will affect protrusion height only by affecting the melted pool size. Fluid dynamics do not appear to play a significant role in the protrusion formation mechanism. It is observed that protrusion height is lower for the larger beam diameter curve, which is apparently a consequence of the difference in the Gaussian heating profile. For a larger beam diameter, the top of the Gaussian beam is flatter spatially, indicating that the melted pool will be shallower with the same melted pool size and, hence, the resulting protrusion height lower.

EXAMPLES

Figure 8A:
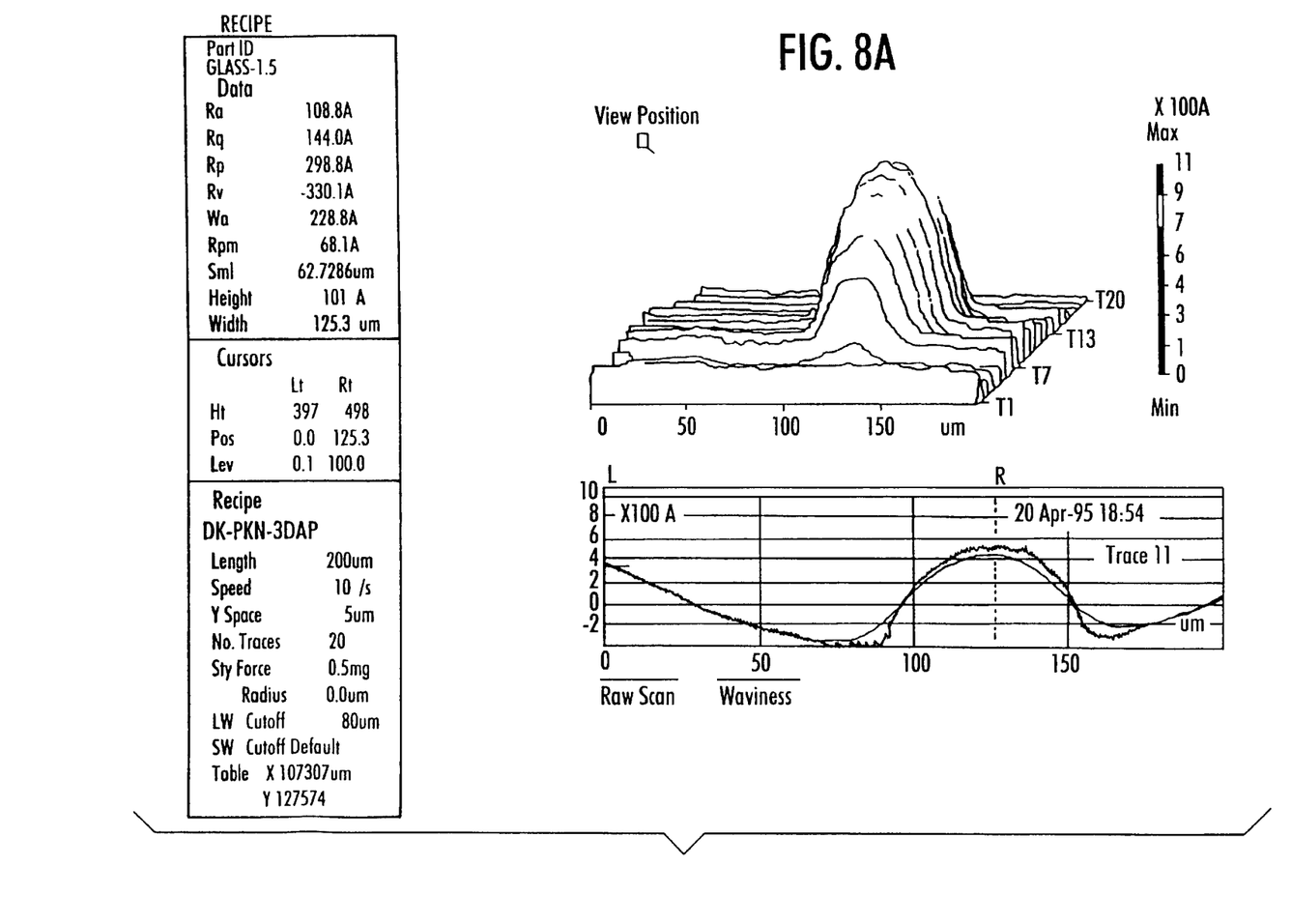
FIG. 8A is a Tencor 3D image of a laser protrusion on a glass substrate in accordance with the present invention.
Figure 8B:
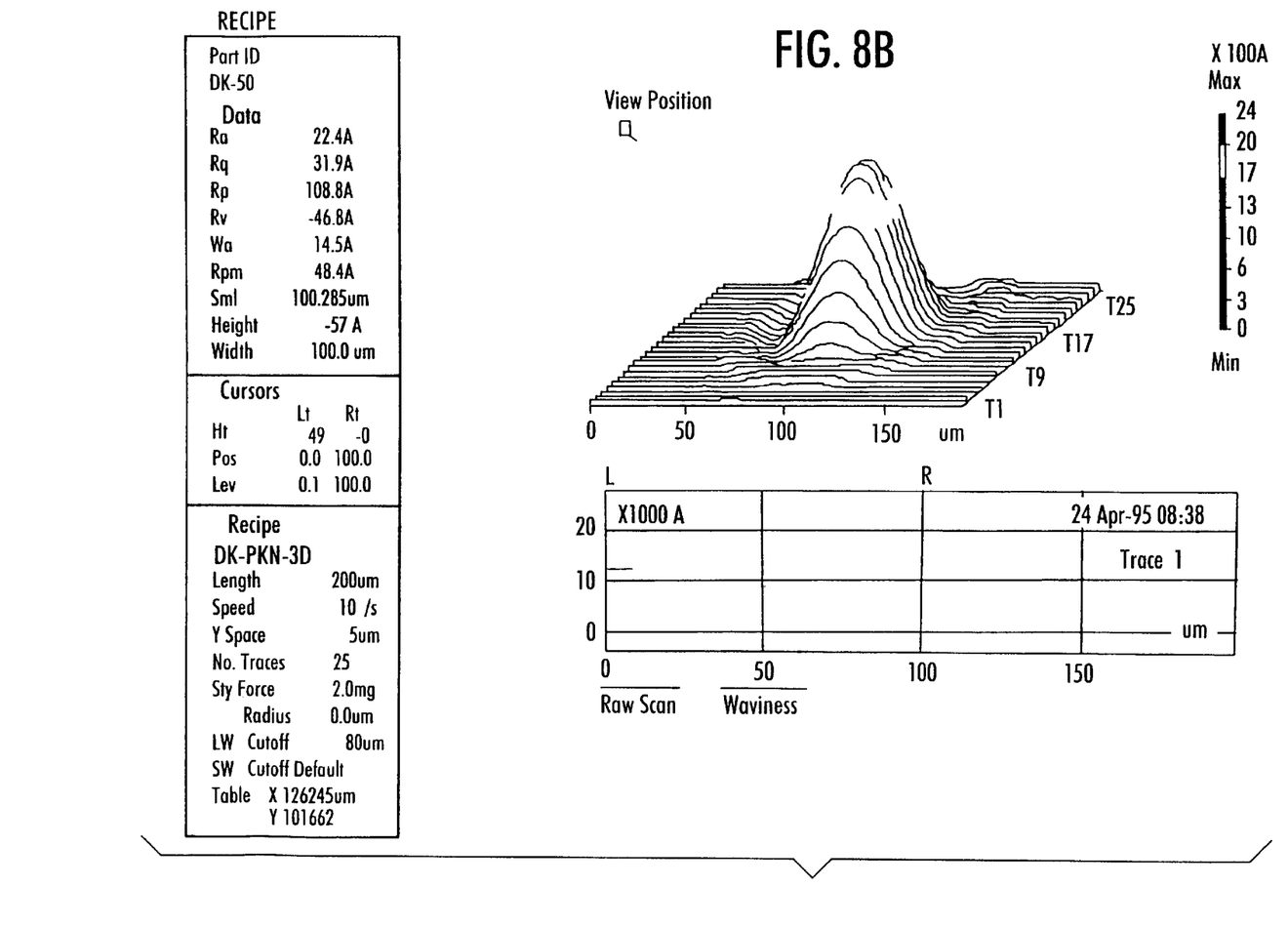
FIG. 8B is a Tencor 3D image of a laser protrusion on a glass-ceramic substrate in accordance with the present invention.

A glass substrate was textured using a $CO_2$ derived laser light beam using the FIG. 2 apparatus resulting in a protrusion shown in FIG. 8A. A Flint glass-ceramic substrate was textured using a $CO_2$ derived laser light beam using the FIG. 2 apparatus resulting in a protrusion shown in FIG. 8A.

In accordance with the present invention, a surface of a glass, ceramic or glass-ceramic substrate is provided with an accurately controlled textured landing zone utilizing a pulsed, focused laser beam utilizing an AOM to achieve a high pulse repetition rate and/or a short pulse width, thereby significantly increasing production throughput with efficient energy utilization. The resulting laser texture comprises a plurality of accurately positioned protrusions controlled and shaped to optimize tribologic and magnetic requirements compatible with the escalating requirements for high density and mobile computer data storage applications, such as laptop computers. Commercially available glass, ceramic or glass-ceramic substrates can be polished to provide a specular surface and a landing zone accurately formed thereon by the laser texturing technique in accordance with the present invention, leaving a specular data zone with maximized areal recording density.

The magnetic layers deposited in accordance with the present invention can be any of those conventionally employed in the production of magnetic recording media. Such conventional magnetic alloys, include, but are not limited to, cobalt (Co)-base alloys, such as cobalt-chromium (CoCr), cobalt-samarium (CoSm), cobalt-chromium-tantalum (CoCrTa), cobalt-nickel-chromium (CoNiCr), cobalt-chromium-samarium (CoCrSm), cobalt-chromium-platinum-tantalum (CoCrPtTa), cobalt-chromium-platinum (CoCrPt), cobalt-nickel-platinum (CoNiPt), cobalt-nickel-chromium-platinum (CoNiCrPt) and cobalt-chromium-platinum-boron (CoCrPtB). The thickness of the magnetic layer is consistent with conventional practices and manufacturing a magnetic recording medium. Cobalt-base alloys having a thickness of about 100 Å to about 1000 Å, such as 200 Å to about 500 Å, has been found suitable.

As in conventional practices, an underlayer can be deposited on the textured substrate prior to depositing the magnetic layer. The underlayer can comprise Cr or a Cr-alloy, such as chromium-vanadium or chromium-titanium, oxygen-doped Cr, tungsten or a tungsten alloy.

In addition, a protective overcoat, such as a carbon overcoat, can be deposited on the magnetic layer, and a lubricant topcoat deposited on the protective overcoat. The underlayer, magnetic layers and protective overcoat can be applied in a conventional manner, by any of various sputtering techniques, deposited in conventional thicknesses employed in production of magnetic recording media.

The present invention can be employed to produce any of various types of magnetic recording media including thin film disks, with an attendant improvement in flying stability, glide performance and head-medium interface reliability. Moreover, the precise manner in which a landing zone is laser textured enables increased areal recording density and reduction in the size of head sliders.

Only the preferred embodiment of the invention and but a few examples of its versatility are shown and described in the present disclosure. It is to be understood that the invention is capable of use in various other combinations and environments and is capable of changes or modifications within the scope of the inventive concept as expressed herein.

What is claimed is:

1. A method of manufacturing a magnetic recording medium, which method comprises:

texturing the surface of a glass, ceramic or glass-ceramic substrate by exposing the surface to a pulsed, focused laser light beam, through an acoustic-optical modulator to form a plurality of dome-like protrusions.

2. The method according to claim 1, comprising rotating the substrate during laser texturing.

3. The method according to claim 1, comprising texturing the surface with a laser light beam having a wavelength of about 10 $\mu$m.

4. The method according to claim 3, comprising texturing the surface with a laser light beam derived from a CW $CO_2$ laser source.

5. The method according to claim 1, comprising pulsing the laser light beam at a pulse repetition rate greater than 100 kHz.

6. The method according to claim 5, employing a 100 watt CW $CO_2$ laser source.

7. The method according to claim 1, comprising pulsing the laser light beam at a pulse repetition rate greater than 300 kHz.

8. The method according to claim 7, employing a 100 watt CW $CO_2$ laser source.

9. The method according to claim 8, comprising pulsing the laser light beam at a pulsed repetition rate greater than 400 kHz.

10. The method according to claim 1, comprising pulsing the laser light beam at a pulse duration of less than 1 $\mu$s.

11. The method according to claim 10, comprising employing an acoustical-optical modulator having a band width greater than 2 MHz.

12. The method according to claim 1, comprising laser texturing the surface to form a landing zone.

13. The method according to claim 12, further comprising depositing a magnetic layer on the textured surface, wherein the texture is substantially replicated on the magnetic layer.

14. The method according to claim 12, wherein the textured surface is substantially replicated on subsequently deposited layers.

15. The method according to claim 12, comprising: polishing the upper surface of the substrate; and laser texturing a portion of the surface to form a landing zone leaving a polished data zone.

* * * * *